US010177574B2

(12) United States Patent
Guo et al.

(10) Patent No.: US 10,177,574 B2
(45) Date of Patent: Jan. 8, 2019

(54) DYNAMIC FREQUENCY CONTROL SCHEME FOR MICROGRIDS USING ENERGY STORAGE

(71) Applicant: NEC Laboratories America, Inc., Princeton, NJ (US)

(72) Inventors: Feng Guo, Sunnyvale, CA (US); Ratnesh Sharma, Fremont, CA (US); Ajit Renjit, Mountain View, CA (US)

(73) Assignee: NEC Corporation (JP)

( * ) Notice: Subject to any disclaimer, the term of this patent is extended or adjusted under 35 U.S.C. 154(b) by 201 days.

(21) Appl. No.: 15/279,393

(22) Filed: Sep. 28, 2016

(65) Prior Publication Data

US 2018/0090936 A1 Mar. 29, 2018

(51) Int. Cl.
*H02J 3/38* (2006.01)
*H02J 3/24* (2006.01)
*H02J 3/28* (2006.01)
*H02J 3/00* (2006.01)

(52) U.S. Cl.
CPC ............... *H02J 3/382* (2013.01); *H02J 3/24* (2013.01); *H02J 3/28* (2013.01); *H02J 2003/007* (2013.01)

(58) Field of Classification Search
CPC ............................................. H02J 3/381–3/387
See application file for complete search history.

(56) References Cited

U.S. PATENT DOCUMENTS

| 6,826,521 B1 * | 11/2004 | Hess | G05B 13/048 |
| | | | 700/29 |
| 9,312,699 B2 * | 4/2016 | Taimela | H02J 3/381 |
| 2011/0148114 A1 * | 6/2011 | Garcia | H02J 3/386 |
| | | | 290/44 |
| 2011/0270463 A1 * | 11/2011 | Weiss | H02P 9/02 |
| | | | 700/298 |
| 2015/0162750 A1 * | 6/2015 | Varma | H02J 3/385 |
| | | | 307/52 |

* cited by examiner

*Primary Examiner* — Fritz M Fleming
(74) *Attorney, Agent, or Firm* — Joseph Kolodka

(57) ABSTRACT

Aspects of the present disclosure describe methods and systems for improved control strategies for Dynamic Frequency Control (DFC) of Energy Storage (ES) devices which may be used to determine an amount of intertial support required from ES to provide frequency regulation based on type of disturbance and frequency control system of a microgrid. A case study showing the control strategy for DFC scheme is presented.

3 Claims, 19 Drawing Sheets

------ LOW SPEED COMMUNICATION LINK

FIG. 19

$$\dot{x}(t) = Ax(t) + Bu(t);$$

$$y(t) = Cx(t) + Du(t); x(0) = x_0;$$

$$x(t) = [\Delta\delta_{12} \, \Delta\omega_1 \, \Delta\omega_2 \, \Delta T_{m2} \, \Delta\omega_{e2}]; \quad u(t) = [\Delta P_L];$$

$$A = \begin{bmatrix} 0 & 1 & -1 & 0 & 0 \\ -\dfrac{P_{o21}}{M_1} & -\dfrac{D_1}{M_1} & 0 & 0 & 0 \\ \dfrac{P_{o21}}{\omega^*/2} & 0 & 0 & 0 & 0 \\ \dfrac{k_{p2}*P_{o21}}{D_2+\tau_2} & 0 & -\dfrac{k_{p2}}{\tau_2} & -\dfrac{1}{\tau_2} & \dfrac{1}{\tau_2} \\ \dfrac{k_{i2}*P_{o21}}{D_2} & 0 & -k_{i2} & 0 & 0 \end{bmatrix};$$

$$B = \begin{bmatrix} 0 \\ -\dfrac{1}{M_1} \\ 0 \\ 0 \\ 0 \end{bmatrix}; \quad C = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}; \quad D = \begin{bmatrix} 0 \\ 0 \\ 0 \\ 0 \\ 0 \end{bmatrix},$$

DYNAMIC FREQUENCY CONTROL SCHEME FOR MICROGRIDS USING ENERGY STORAGE

TECHNICAL FIELD

This disclosure relates generally to energy storage methods and systems. More particularly, this disclosure relates to methods and systems of dynamic frequency control for microgrids using energy storage.

BACKGROUND

As is known, microgrids with increased penetration of renewables have significant frequency excursions to power generation changes. A straight forward approach to this problem of frequency regulation and control is to complement the renewable energy resources with large energy storage (ES) devices to provide Dynamic Frequency Control (DFC) for its reliable operation. However, the amount of intertial support from the ES varies based on the type of interconnected DERs and also the amount of load change.

Accordingly, given its emerging importance to power generation and distribution, methods and structures that enhance or otherwise facilitate dynamic frequency control would represent a welcome addition to the art.

SUMMARY

An advance in the art is made according to the present disclosure which describes methods and structures for improved dynamic frequency control of microgrids using energy storage and in particular advantageously solves inertial issue(s) identified herein. More particularly, methods, systems and structures describing an analytical framework that determines an amount of virtual inertia that is programmed into a controller based on a type of disturbance and on the frequency control system of the microgrid.

According to an aspect of the present disclosure, for a microgrid energy system comprising a plurality of generation branches each branch including an electrical generator and a local controller, the microgrid energy system having a central controller in communication with each of the plurality of local controllers, a computer implemented method for improved dynamic frequency control of the energy system, methods according to the present disclosure determine, by the central controller, basic information of the microgrid operation including configuration of each of the generators, parameters of each local controller and electrical topology; determine, by the central controller, system resilience requirement including an accepted frequency deviation and maximum tolerable power disturbance; update, by the central controller, during operation of the energy system system parameters at a predetermined frequency; develop, by the central controller, a reduced order model (ROM) of the system; determine, by the central controller, a value of a virtual inertia of a branch from a state space model of the system derived from the ROM; and providing, by the central controller, the virtual energy value to the local controller of the branch for which the virtual inertia value was determined.

Finally, and of further advantage, and as will be shown and quantified, method(s) and structures according to the present disclosure produce significant performance improvements in while reducing cost of operation.

BRIEF DESCRIPTION OF THE DRAWING

A more complete understanding of the present disclosure may be realized by reference to the accompanying drawing in which:

FIG. 19 is a state space model based on ROM of a microgrid according to an aspect of the present disclosure.

Figure 1:
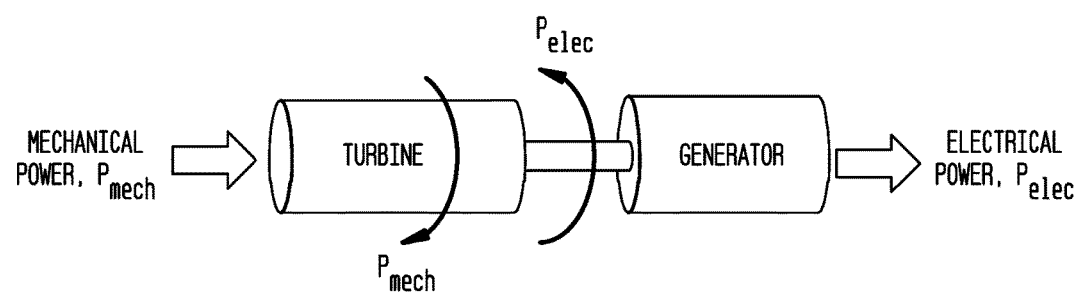
FIG. 1 is a schematic diagram of a traditional, prior-art steam-turbine.

The illustrative embodiments are described more fully by the Figures and detailed description. Inventions according to this disclosure may, however, be embodied in various forms and are not limited to specific or illustrative embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, we again note that the increasing demand for improved power quality and reliability along with the distributed nature of renewable energy resources has enabled distributed generation to be a desirable alternative to the traditional centralized generation. Since most of the distributed energy resources (DERs) have an inverter as their utility interface to the grid they bring down the system inertia significantly causing the grid to be more prone to frequency instability (see, e.g., A. Azmy and I. Erlich, "Impact of distributed power generation on the stability of electrical power system," in Proc. IEEE Power Eng. Soc. Gen. Meeting, 2005, pp. 1056-1063; F. Katirei, M. R. Irvani, and P. W. Lehn, "Micro-grid autonomous operation during and subsequent to islanding process," IEEE Trans. Power Del., vol. 20, no. 1, pp. 248-257, January 2005; and L. Meegahapola and D. Flynn, "Impact on transient and frequency stability for a power system at very high wind penetration," in Proc. IEEE Power Eng. Soc. Gen. Meeting, 2010, pp. 1-8)).

Moreover, the high proliferation of renewables further compromises the system due to its intermittent nature and also being operated as non-dispatchable resources (See, e.g., A. Mullane, G. Bryand, and M. O'Malley, "Kinetic energy and frequency response comparison for renewable generation systems," in Proc. Int. Conf. Future Power Systems, Nov. 16-18, 2005, p. 6). Under such circumstances, an islanded microgrid with renewables presents one of the greatest technical challenges for frequency regulation as it is more sensitive to generation-load imbalances. Such distrubances on an islanded microgrid can result in sizeable frequency excursions for system disturbances, increasing the risk o funder frequency load shedding (UFLS) and cascading outages.

In order to improve the reliability of islanded microgrids, it is essential to tackle the inertia issue. Several solutions have been proposed, such as extra rotating masses added to power systems via the connection of generators dispatched in synchronous compensation mode (See, e.g., J. Bomer, K. Burges, C. Nabe, and M. Poller, All Island TSO Facilitation of Renewables Study—Final Report for Work Package 3, Ecofys, Germany, Tech. Rep. PEGEDE083532, June 2010). Another option includes complementing the system with energy storage and by that adding inertia to the system virtually (See, e.g., M. P. N. vanWesenbeeck, S. W. H. deHann, P. Varela, and K. Visscher, "Grid tied converter with virtual kinetic storage," in Proc. IEEE Power Tech Conf., Bucharest, Romania, July 2009; and J. Driesen and K. Visscher, "Virtual synchronous generators, "in Proc. IEEE PES General Meeting, Pittsburgh, Pa., July 2008). In a paper entitled Dynamic Frequency Control Support By Energy Storage To Reduce The Impact of Wind and Solar Generation on Isolated Power System's Inertia, which appeared in IEEE Trans. Sustain. Energy, vol. 3, no. 4, pp 931-939, October 2012, the authors propose a virtual inertia based control algorithm for energy storage that provides Dynamic Frequency Control (DFC) support in the French island of Guadeloupe which has a significant penetration of renewables. Here, the control algorithm was designed in such a way that it deploys the energy storage completely at the instant when the rate of change of frequency crosses a threshold value during a large generation change.

Another popular technique to provide DFC is by enabling the energy storage to emulate the behavior of traditional synchronous generators, popularly known as Virtual Synchronous Generators (VSG)—(See, e.g., K. Visscher and S. W. H. DeHaan, "Virtual Synchronous Machines (VSGs) for frequency stabilization in future grids with significant share of decentralized generation," in Proc. IET-CIRED Seminar Smart-Grids Distrib., 2008, pp 1-4; H. P. Beck and R. Hesse, "Virtual synchronous machine," in Proc. IEEE EPQU Conf. 2007, pp. 1-8; Q. C. Zhong and G. Weiss, "Synchroverters: Inverters thatmimic synchronous generators," IEEE Trans. Ind. Electron., vol 58, no. 4, pp. 1259-1267, April 2011; and M. Torres and L. A. C. Lopes, "Virtual synchronous generator control in autonomous wind-diesel power systems," in Proc. IEEE-EPEC Conf, 2009, pp. 1-6)). Unlike the traditional generators, the VSG has the disturbance and alwo on the frequency control system of every DER connected in the microgrid. However, one of the key challenges in developing such a scheme is in choosing the amount of inertia that needs to be programmed in its controller under different operating conditions. In other papers (See, e.g., T. Shintai, Y. Miura and T. Ise "Oscillation Damping of a Distribute dGenerator Using a Virtual Synchronous Generator," Power Delivery, IEEE Transactions on, vol., 19, no. 2, pp. 668, 676, April 2014; and J. Alipoor, Y. Miura and T. Ise, "Power System Stabilization Using Virtual Synchrounous Generator With Alternating Moment of Inertia," Emerging and Selected Topics in Power Electronics, IEEE Journal of, vol. 3, no. 2, pp. 451,458, June 2015), the idea of adaptive media in a VSG is proposed, which allows the selection of moment of inertia real-time to enhance the fast response of the VSG in tracking the steady-state frequency. A self-tuning VSG has been proposed (See, e.g., M. Torres, L. A. C. Lopes and L. A. Moran and J. R. Espinoza, "Self Tuning Virtual Synchronous Machine: A Control Strategy for Energy Storage Systems to Support Dynamic Frequency Control," Energy Conversion, IEEE Transactions on, vol. 29, no. 4, pp. 833, 840, December 2014) which makes use of an optimization algorithm to minimize the frequency deviations (amplitude and rate of change) and the power flow through the energy storage. Although, these prior-art references provide promising results, the analytical framework behind the choice of the moment of inertia has not been disclosed to date. According, one aspect of the present disclosure is to develop and describe an analytical framework for the DFC scheme in energy storage systems that may be used to calculate the amount of virtual inertia to be programmed in the controller based on the type of disturbance and also on the frequency control system of the microgrid.

A. Traditional Power Systems with Inertia

FIG. 1 shows a block diagram of a traditional steam turbine with governor, prime-mover and rotating mass. During a large disturbance, an unbalance between the mechanical power input and the electrical load demand happens which needs to be corrected by frequency regulation. There are several levels of frequency regulation techniques that operate hierarchically to perform the balancing act. For our purposes, it may be classified into four (4) levels that are usually present in large interconnected systems namely: 1) Inertial response (initial few seconds); 2) Governor response (i.e., Primary Frequency Control—in the time frame of a few seconds); 3) Automatic Generation Control (i.e., Secondary Frequency Control—in the time frame of a few minutes); and 4: Tertiary frequency control.

Among these techniques, the inertial response is uncontrollable and primarily influences the transient behavior of the generator immediately after the disturbance. Note that it may be better explained using an electromechanical energy conversion dynamic equation in the turbine namely:

(Mech. Energy Input from Engine)=(Elec. Energy Output)+(Energy Dissipated)+(Increase in Kinetic Energy,$\Delta$KE)

In terms of power quantities, this dynamic equation during transient conditions can be defined as:

$$\frac{\Delta KE}{\Delta t} = P_{mech} - P_{elec} - P_{loss} \text{ or} \quad [1]$$

$$J\omega \frac{\Delta \omega}{\Delta t} = P_{mech} - P_{elec} - P_{loss} \quad [2]$$

$$\frac{\Delta \omega}{\Delta t} = \frac{P_{mech} - P_{elec} - P_{loss}}{J\omega} \quad [3]$$

where $P_{mech}$ is the mechanical input power, $P_{elec}$ is the electrical output power, and $P_{loss}$ accounts for the power dissipated as losses, J represents the moment of inertia and $\omega$ represents the angular frequency of the generator. The stored kinetic energy, $$\left(J\omega \frac{\Delta \omega}{\Delta t}\right)$$

in the system compensates for the difference between the electrical and mechanical power in [2]. The amount of change in speed, $\Delta\omega$ and the rate at which the speed changes, $$\frac{\Delta \omega}{\Delta t}$$

are inversely proportional to the inertia, J of the prime-mover. From [3], it could be understood that the inertial response plays a major role in the initial frequency decline/increase after a disturbance. Along with the governor response, it dictates the maximum frequency deviation $\Delta\omega_{max}$.

The traditional power grid with interconnected generating units, have high inertia rotors with stored kinetic energy. This explains the reason behind the system frequency being regulated within acceptable limits even after large disturbances.

B. Microgrids with Virtual Inertia

With the increased penetration of renewables in the power system, the system inertia of the grid has been steadily declining, This causes large frequency transients, which makes the power system more prone to instability during disturbances. Islanded microgrids are especially more sensitive to these disturbances as they have small-sized DERs with low inertia which cannot absorb in themselves any large power mismatch between the load demand and generation from prime-mover/energy source. The addition of renewables in islanded systems further worsens the case. In order to improve the reliability of microgrids where the main grid supply is unavailable, the DERs are supplemented with Energy Storage (ES). These energy storage units provide necessary Dynamic Frequency Control (DFC) support by adding inertia to the system virtually during large disturbances.

Figure 2:
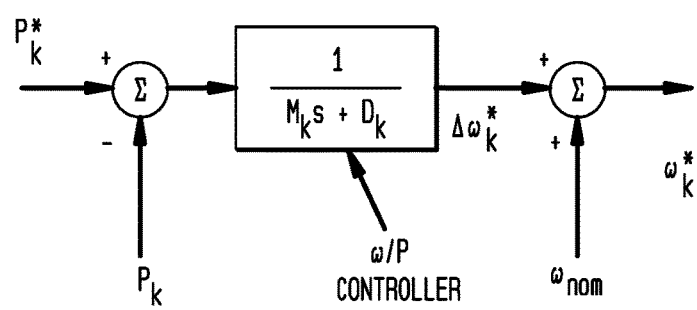
FIG. 2 is a schematic diagram illustrating a representative DFC scheme according to an aspect of the present disclosure.

The idea of DFC is to control the energy storage to emulate the behavior of traditional synchronous generators thereby providing inertial support to the microgrid. FIG. 2 shows the control architecture of the DFC scheme. It should be noted that the well-known swing equation of traditional generators is used to develop the DFC. As is known, the ES either injects or absorbs power after a disturbance based on the amount of inertia programmed in its controller.

$$P_k^* - P_k = M_k\left(\frac{d\omega_k^*}{dt}\right) + D_k(\omega_k^* - \omega_{nom}) \quad [4]$$

$$P_k^* - P_k = J_k\omega_k^*\left(\frac{d\omega_k^*}{dt}\right) + D_k(\omega_k^* - \omega_{nom}) \quad [5]$$

This is similar to the traditional generators with stored kinetic energy in its rotating shaft. However, one notable feature of DFC is that the amount of inertia is controllable—unlike the traditional rotating generators. Advantageously, this provides us with an additional degree of freedom to control the amount of frequency deviation $\Delta\omega_k$ based on the severity of the disturbance and the inertial support provided by their other interconnected DERs.

Figure 3:
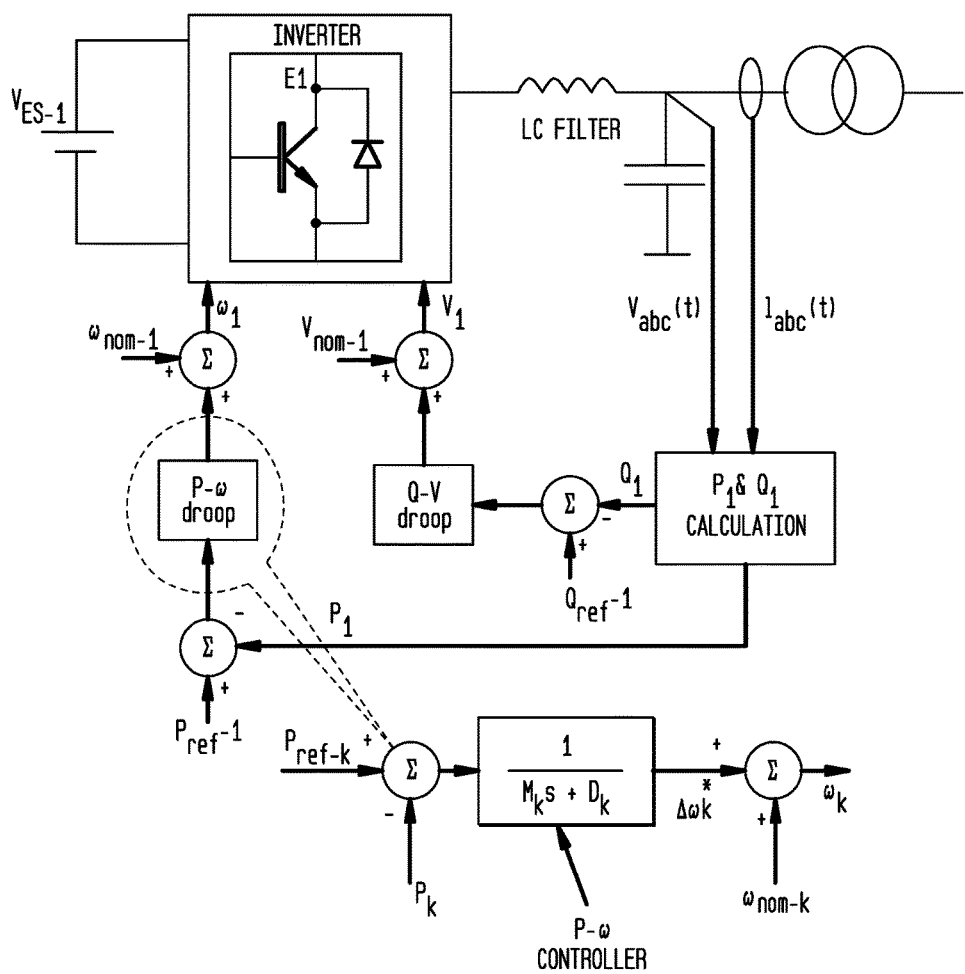
FIG. 3 is a schematic diagram illustrating a control block diagram of the ES with its real and reactive power droop controllers along with the DFC scheme according to an aspect of the present disclosure.

FIG. 3 shows a control block diagram of an ES-based DFC that has been implemented in an outer loop of the inverter controls. One main challenge in implementing DFC in the ES is to calculate a most appropriate value of angular momentum, "$M_k$" to be incorporated into the controller to maintain the system frequency within acceptable limits. We may now present a detailed analysis to calculate "$M_k$" for an islanded microgrid.

DFC Settings Calculation Using Reduced Order and State Space Models

A. Control Strategy

For a rotating generator in the standalone mode of operation, the amount of frequency deviation during a disturbance could be explained using [3]. The generator's shaft angular momentum, $M_k$, the amount of load change and the governor response are key factors that determine the amount of frequency deviation from the nominal. However, in a microgrid the scenario is completely different. Microgrids comprises of different types of DERs (DERs with inverter as their utility interface against DERs that have synchronous generator as their utility interface) with different frequency control schemes to regulate frequency. Moreover, microgrids may also feature dispatchable and non-dispatchable DERs (renewables that operate at their MPPT) which also influence the system frequency in a different way.

Figure 4:
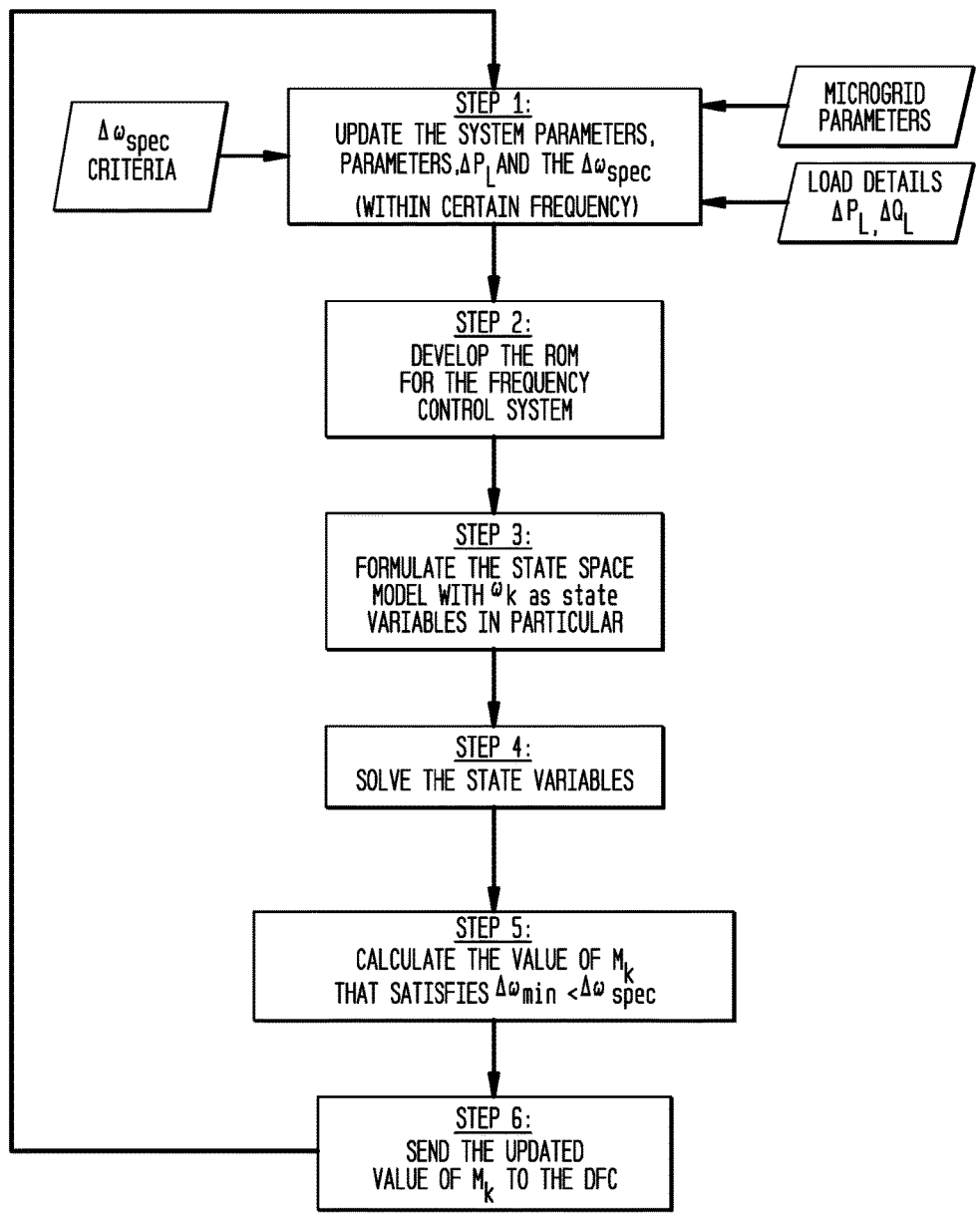
FIG. 4 is a schematic diagram illustrating a flow diagram representing a control strategy according to an aspect of the present disclosure.

According to the present disclosure, a novel control strategy to calculate the controller parameters of the DFC is shown in FIG. 4. Briefly, —and according to the present disclosure—different parameters of the microgrid are used to develop a Reduced Order Model (ROM) of the frequency control system. Using this model, the state space equations of the system are derived with the frequency of the DERs, $\Delta\omega_1$, $\Delta\omega_2$ as mandatory state variables. The dynamic equations of the state variables are then used to determine the value of angular momentum $M_k$ that reduces the maximum frequency deviation $\Delta\omega_{max}$ within the acceptable limits specified, $\Delta\omega_{spec}$. The amount of droop required for steady-state power sharing between the diesel-generator and the ES is determined by the parameter $D_k$.

B. System Description

Figure 5:
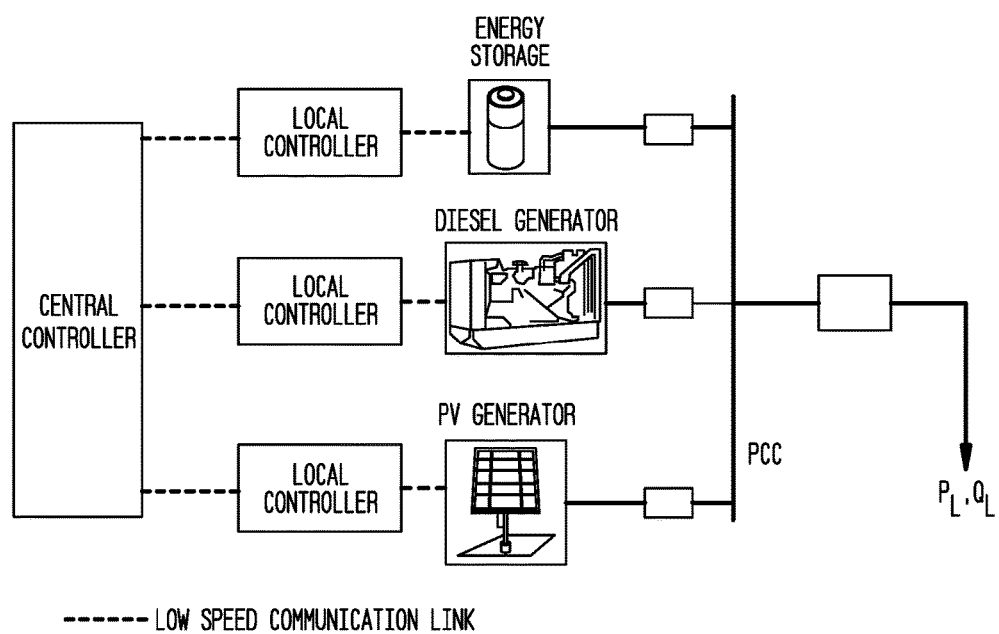
FIG. 5 is a schematic diagram illustrating a system chosen for studying the effects of DFC according to the present disclosure.
Figure 6:
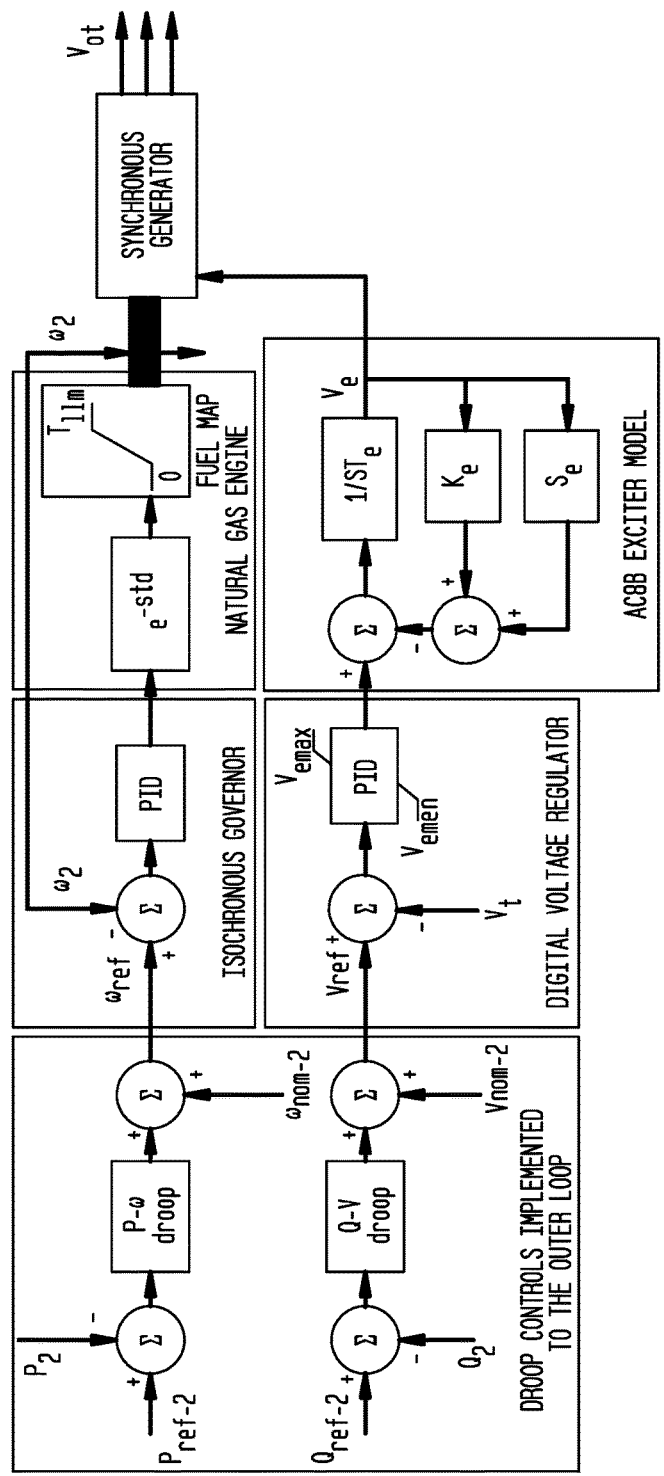
FIG. 6 is a schematic diagram illustrating a block diagram of the diesel generator model according to an aspect of the present disclosure.

Therefore, the system chosen to study the effects of the DFC during a power generation change according to the present disclosure is a PV-diesel-ES hybrid power system is shown schematically in FIG. 5. The system comprises a diesel-generator set, a PV generator equipped with a Maximum Power Point Tracking (MPPT) control (See, e.g., REF 16), an ES and AC load. Additionally, it is assumed that the microgrid is always disconnected from the main grid and independently operated as a stand-alone system. Further information about the gen-set used in the system modeled as a voltage source similarly to earlier work by the inventors of the present disclosure (See, e.g., REFs 17-18) is shown schematically in FIG. 6.

TABLE 1

| SI. No | Type of DER | % of the total rating | Actual Rating (kW) |
|---|---|---|---|
| 1 | Synchronous generator | 62.5% | 200 kW |
| 2 | PV generator | 25% | 80 kW |
| 3 | Energy Storage | 12.5% | 40 kW |

System Configuration

As may be appreciated, droop controls are employed for generating engine speed reference $\Delta\omega_2$ for the isochronous governor with the reference power, $P_{ref-2}$ and droop gain, $D_2$. The isochronous governor of the gen-set controls the quantity of fuel input to the engine, and causes an increase/decrease of the engine torque. However, the change in torque is not instantaneous as it is constrained by factors like fuel transport delay, turbocharger time constant and availability of sufficient combustion air. From the prior art, (See, e.g., A. Gangopadhayay, P. Meckl, "Modeling, validation and system identification of a natural gas engine," Proceedings of the 1997 American Control Conference, Albuquerque, N.J., vol. 1, 1997, pp. 294-298) the total delay between fuel calculation and torque production has been calculated. Another key component for genset control is the excitation system of synchronous generator. The generator field circuit is excited by an ac brushless excitation system tha tis modeled using an AC8B IEEE model (See, e.g., REF 21) Finally, the governor and exciter give the two control inputs to the synchronous generator which is readily available in the MATLAB.Simulink and SimPowerSystems toolbox.

Figure 7:
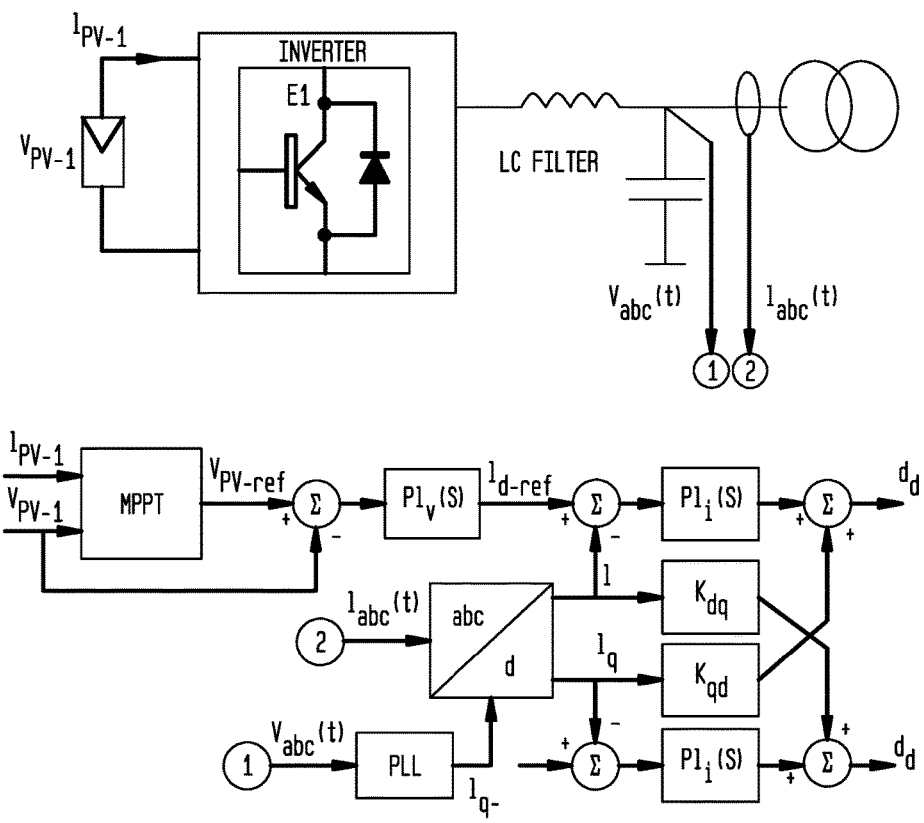
FIG. 7 is a schematic block diagram illustrating CSI PV generator controls according to an aspect of the present disclosure.

The PV generator is modeled as a conventional current sourced inverter which always operates at unity power factor by injecting a prescribed current in phase with 3-phase voltage vector. This is shown in FIG. 7.

C. Reduced Order and State Space Models

Figure 8:
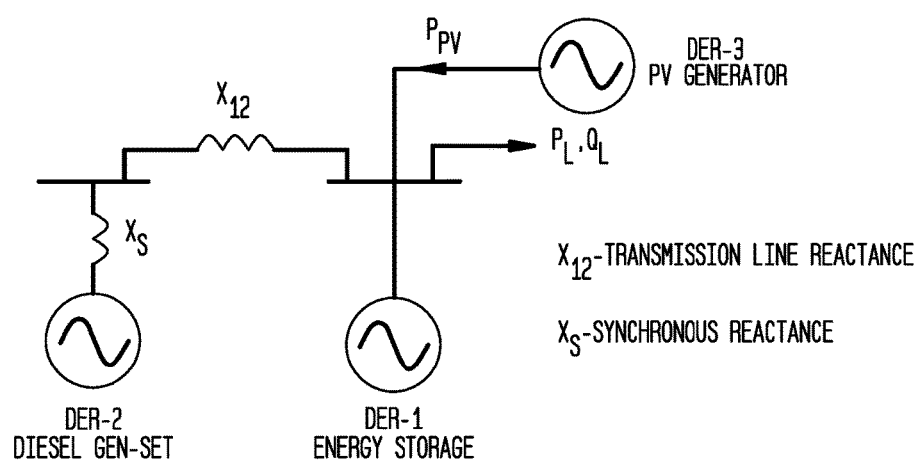
FIG. 8 is a schematic diagram illustrating SLD of a system considered for simulation according to an aspect of the present disclosure.
Figure 9:
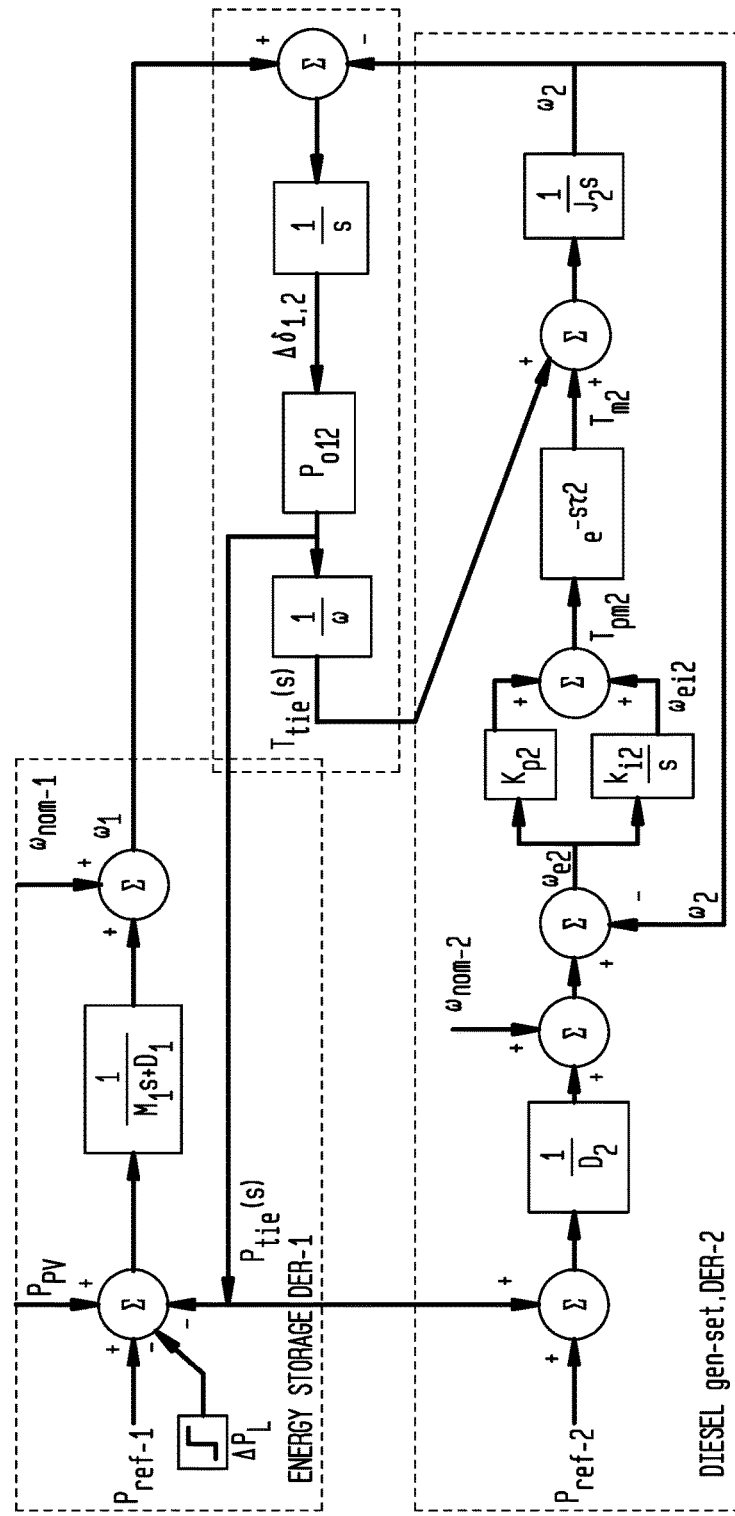
FIG. 9 is a schematic block diagram illustrating a Reduced Order Model (ROM) used to derive state space equations according to an aspect of the present disclosure.

A single line diagram (SLD) of the system used to study the effect of DFC is shown schematically in FIG. 8. As will be readily appreciated by those skilled in the art, it is difficult to calculate the frequency deviation of this system during a disturbance, a simplified reduced order model representative of the interconnected DERs of FIG. 8 is shown schematically in FIG. 9. Since the PV generator is modeled as a constant power generator which could track the system frequency at any instant using its PLL, it could be represented as a negative load as shown in FIGS. 8 and 9. Notably, FIG. 9 is a simplified block diagram of the Reduced Order Model (ROM) used to derive the state space equations:

$$P_{o,1,2} = \frac{V_1 * V_2}{X_{tie}} \text{ and } X_{tie} = X_{12} + X_s$$

During transient power sharing $X_s = X_d'$; wherein $X_d'$ is the generator's d-axis transient reactance. The system differential equations of FIG. 9 are represented as:

$$\Delta\delta_{21}' = \Delta\omega_1 - \Delta\omega_2 \quad [6]$$

$$\Delta\omega_1' = \frac{-(\Delta P_L + \Delta\delta_{21} * P_{o21} + D_1 * \Delta\omega_2)}{M_1} \quad [7]$$

$$\Delta\omega_2' = \frac{\Delta T_{m2} - \Delta T_{e2}}{J_2} \quad [8]$$

$$\Delta T_{m2}' = \frac{\Delta T_{pm2} - \Delta T_{m2}}{r_2} \quad [9]$$

$$\Delta\omega_{ei2}' = \Delta\omega_{e2} * -k_{i2} \quad [10]$$

Representing the system differential equations in the form:

$$\dot{x}(t) = Ax(t) + Bu(t);$$

$$y(t) = Cx(t) + Du(t); x(0) = x_0$$

$$x(t) = [\Delta\delta_{12} \Delta\omega_1 \Delta\omega_2 \Delta t_{m2} \Delta\omega_{e2}]; u(t) = [\Delta P_L];$$

$$A = \begin{bmatrix} 0 & 1 & -1 & 0 & 0 \\ -\dfrac{P_{o21}}{M_1} & -\dfrac{D_1}{M_1} & 0 & 0 & 0 \\ \dfrac{P_{o21}}{\omega * J_2} & 0 & 0 & \dfrac{1}{J_2} & 0 \\ \dfrac{b_2 * k_{p2} * P_{o21}}{\tau_2} & 0 & -\dfrac{k_{p2}}{\tau_2} & -\dfrac{1}{\tau_2} & \dfrac{1}{\tau_2} \\ b_2 * k_{i2} * P_{o21} & 0 & -k_{i2} & 0 & 0 \end{bmatrix}$$

$$B = \begin{bmatrix} 0 \\ -\dfrac{1}{M_1} \\ 0 \\ 0 \\ 0 \end{bmatrix}; C = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}; D = \begin{bmatrix} 0 \\ 0 \\ 0 \\ 0 \\ 0 \end{bmatrix}$$

In the diesel generation branch, $P_{ref-2}$ is the reference power is the diesel generator, $D_2$ is the droop gain which generates the frequency compensation signal based on the sum of $P_{ref-2}$ and $P_{tie}$ (s). The sum of the frequency compensation signal and the nominal frequency of the diesel generator ↑ $\omega_{nom-1}$ is deducted by the actual frequency of the diesel generator $\omega_2$, and the resulting frequency error $\omega_{e2}$ is sent to the governor which is modeled as a PI controller with gains $k_{p2}$ and $k_{i2}$. The reference torque is represented by $T_{pm2}$.

As may be readily appreciated, the delay block models the total time delay of the diesel gen-set from getting the reference torque $T_{pm2}$ to generate the actual mechanical torque $T_{m2}$. The equivalent electrical torque due to the tie line power flow is represented by $T_{tie}(s)$. The sum of the mechanical torque $T_{m2}$ and $T_{tie}(s)$ is divided by the actual inertia of the gen-set and integrated to calculate the speed of the gen-set, $\omega_2$.

System Simulation for Transient Response

A. Reduced Order Model Validation

Figure 10A:
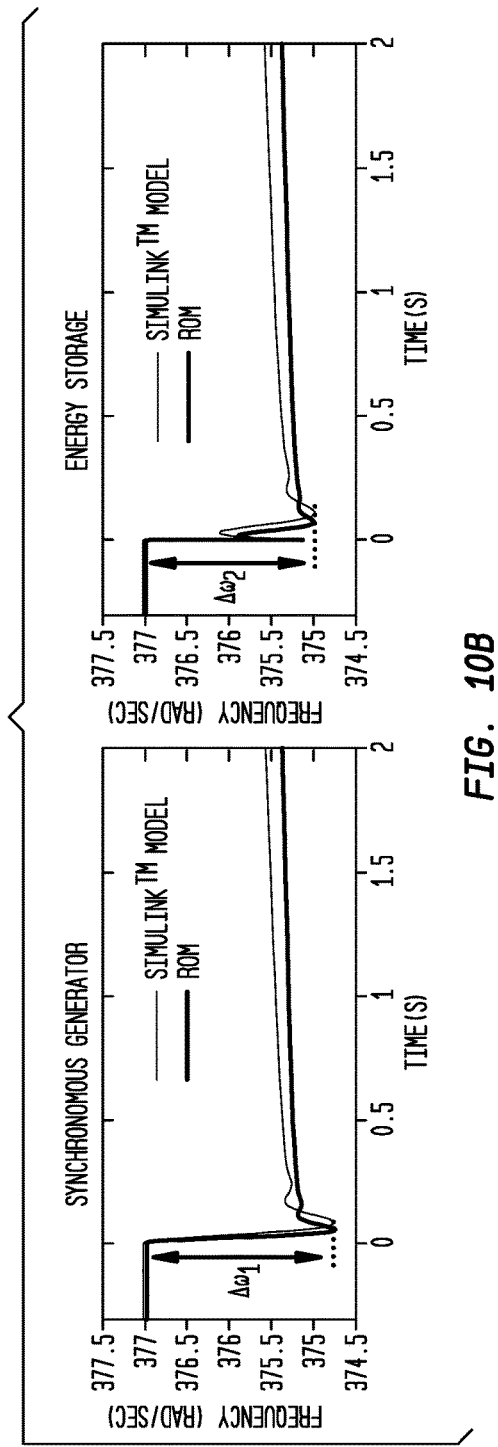
FIG. 10 is a series of plots showing the response of a Simulink and Reduced Order Model (ROM) of DERs for (a) 50 kW and (b) 100 kW step load transients according to an aspect of the present disclosure.
Figure 10B:
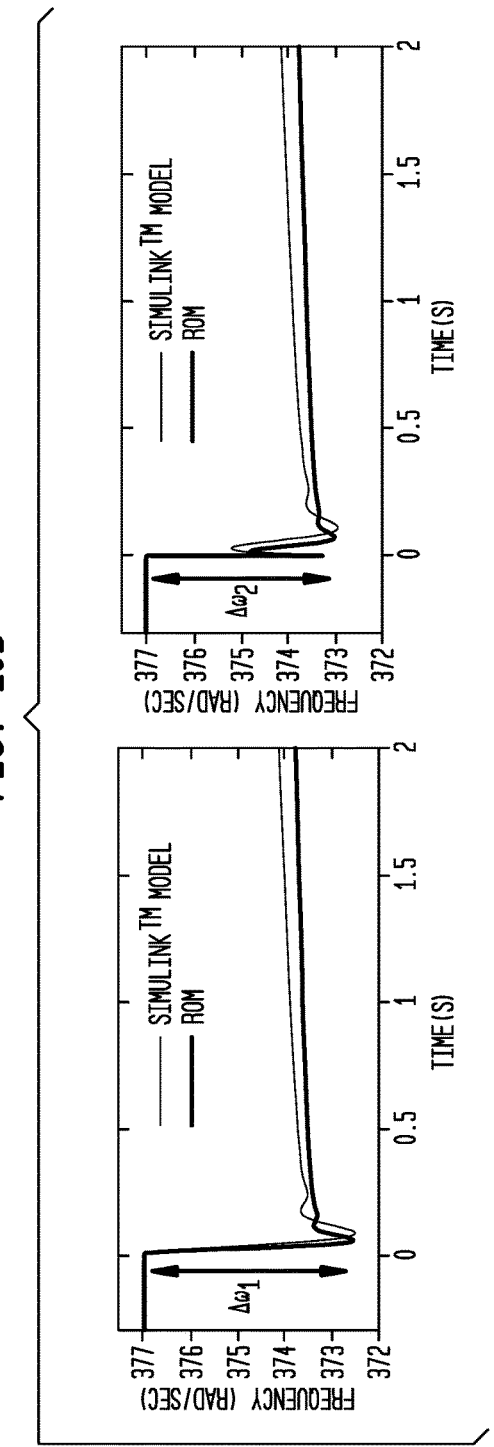

Time domain simulations were carried out in Matlab/Simulink to validate the performance of the reduced order model against the actual Simulink model, and the results are shown in FIG. 10. Although there are slight discrepancies in the results, the maximum frequency deviation, $\Delta\omega_{max}$ is identified to be close using both of the models. Table II lists the amount of frequency deviation in both the reduced order and the actual Simulink model when the system is subjected to different load changes. This confirms that the reduced order model can be used to calculate the minimum frequency deviation during a disturbance. It further helps us to calculate the appropriate value of '$M_k$' that has to be programmed in the DFC scheme to limit the frequency deviation within acceptable limits.

TABLE II

| SI. No | $\Delta P_L$(kW) | $M_1$ (J · s/rad.$^2$) | $\Delta\omega_1 \Delta\omega_2$ Simulink Model | $\Delta\omega_1 \Delta\omega_2$ Reduced Order Model |
|---|---|---|---|---|
| 1 | 50 | 5 | 2.3, 2.0 | 2.3, 1.95 |
| 2 | 100 | 5 | 4.5, 4.1 | 4.4, 4.0 |

Performance Analysis of Framework for Different Test Cases

B. Case Study

Figure 11:
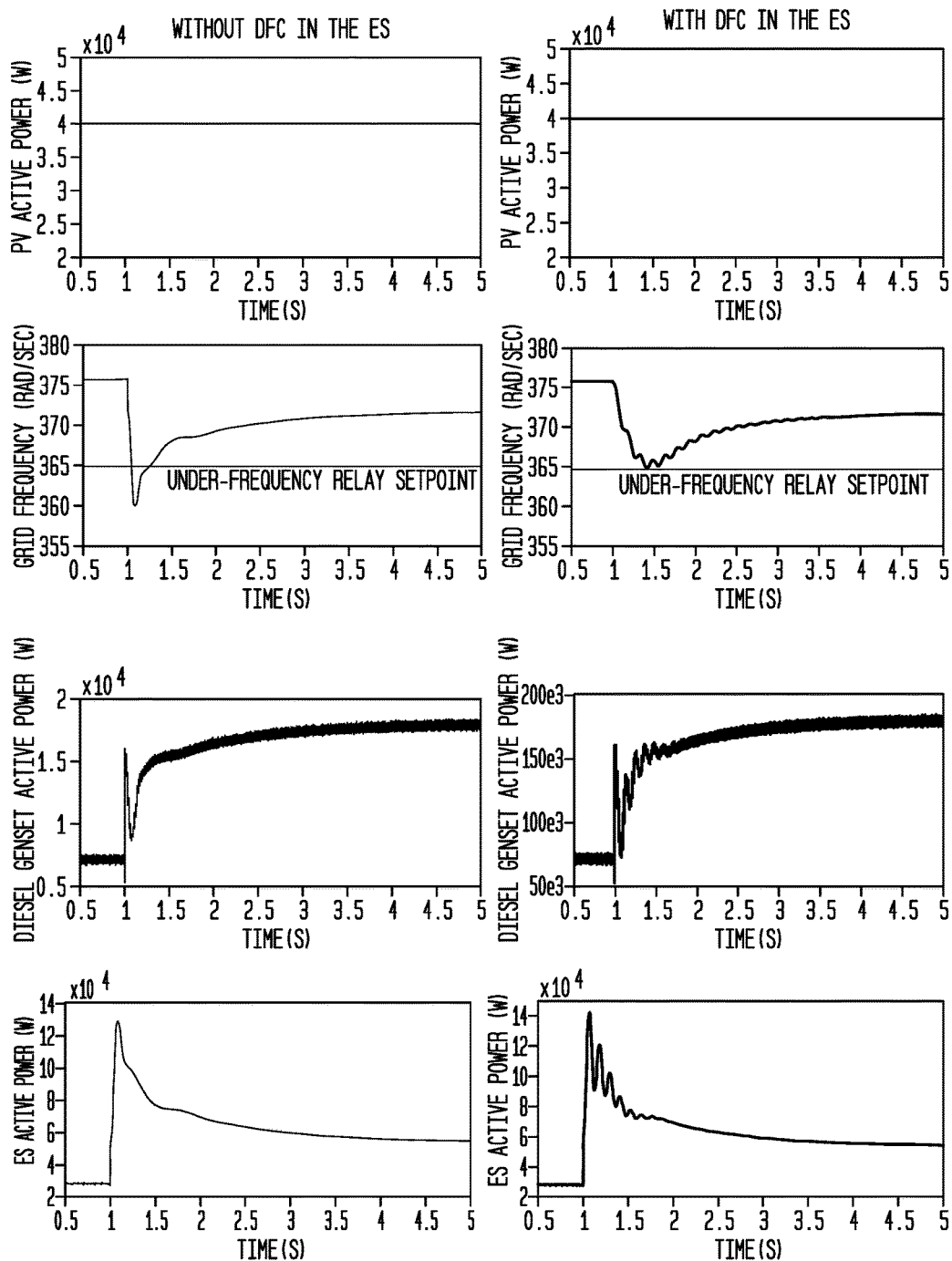
FIG. 11 is a series of plots showing response of the DERs with and without DFC scheme in the ES according to an aspect of the present disclosure.

The performance of the control strategy according to the present disclosure to determine DFC parameters is explained using a case study. The system used for this study is shown in FIG. 5 and the parameters of the system are listed in Table III. The dynamic behavior of the microgrid for a large load change without the DFC implemented in the ES is presented in the leftmost column of FIG. 11. As may be observed, it is apparent that the system has to shed a significant amount of the connected load as the grid frequency has exceed the under-frequency relay setpoint.

Now, the different parameters of the microgrid and the amount of load change, $\Delta P_L$ are substituted in the solved frequency ($\Delta\omega_1$ and $\Delta\omega_2$) equations obtained from the state-space model. The appropriate value of $M_1$ that reduces the frequency deviation to stay within the limits set by the under-frequency relay is then programmed in the DFC. The results obtained for the same load change is presented in the right column of FIG. 11.

TABLE III

| SI. No | Parameter | Value |
|---|---|---|
| 1 | ω/P droop gain - DER-1 & DER-3 | 2 * pi (rad/sec/p.u) |
| 2 | V/Q droop gain - DER-1 & DER-3 | 0.1(V/p.u) |
| 3 | DER-2 maximum power @ 25° C. and 1000 W/m2 | 40 kW |
| 5 | Load change $\Delta P_L$ | 140-280 kW |
| 6 | Under-frequency relay setpoint | ±2 Hz/±12.57 rad/sec |
| 7 | Calculated angular momentum, $M_1$ to be programmed in the DFC | 495 J · S/rad$^2$ |

Test Conditions in the Microgrid

Figure 12:
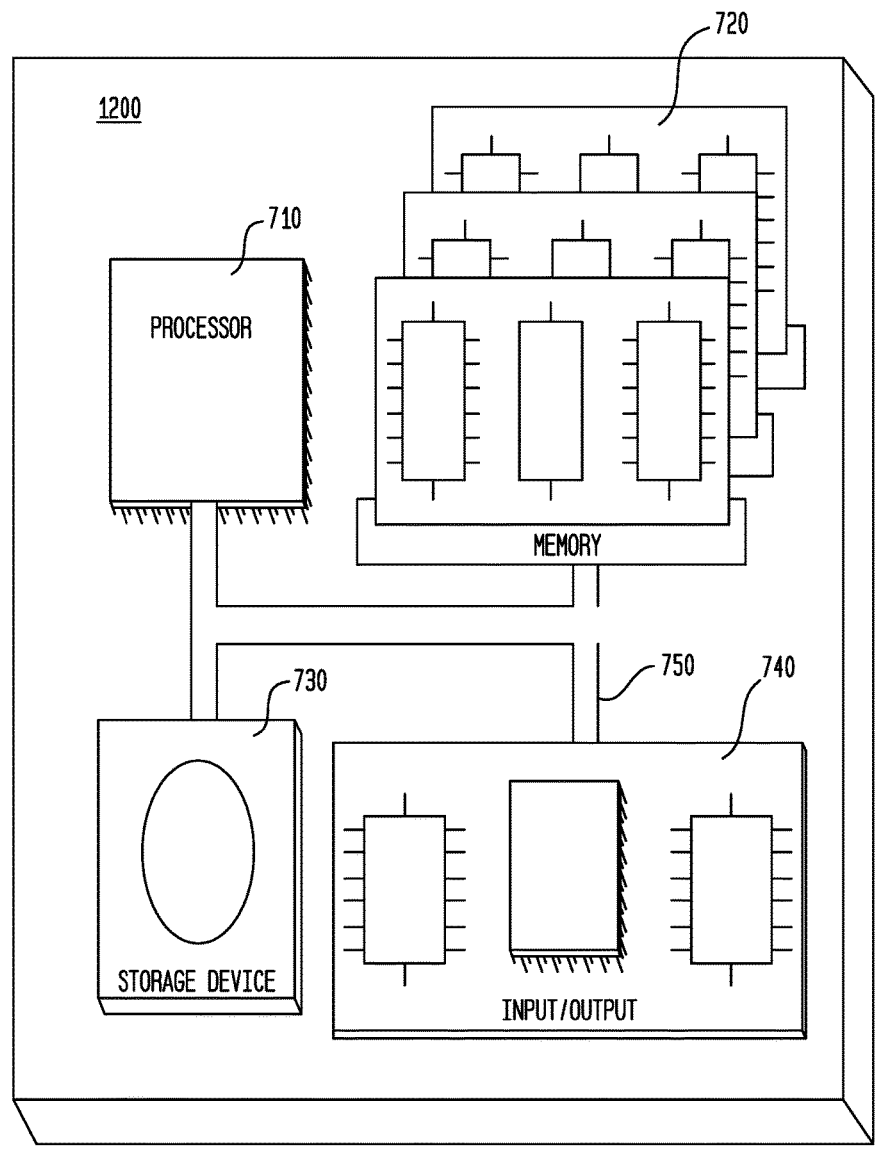
FIG. 12 is a schematic diagram of a representative computer system for operating and defining control strategies according to the present disclosure.

With this theoretical discussion in place and a discussion of our modeling complete, we turn to operational aspects of methods and systems according to the present disclosure. In particular, and with reference now to FIG. 12, there is shown an illustrative computer system 1200 suitable for implementing methods and systems according to an aspect of the present disclosure. As may be immediately appreciated, such a computer system may be integrated into another system such as a router and may be implemented via discrete elements or one or more integrated components. The computer system may comprise, for example a computer running any of a number of operating systems. The above-described methods of the present disclosure may be implemented on the computer system 1200 as stored program control instructions.

Computer system 1200 includes processor 1210, memory 1220, storage device 1230, and input/output structure 1240. One or more input/output devices may include a display 1245. One or more busses 1250 typically interconnect the components, 1210, 1220, 1230, and 1240. Processor 1210 may be a single or multi core. Additionally, the system may include accelerators etc. further comprising the system on a chip.

Processor 1210 executes instructions in which embodiments of the present disclosure may comprise steps described in one or more of the Drawing figures. Such instructions may be stored in memory 1220 or storage device 1230. Data and/or information may be received and output using one or more input/output devices.

Memory 1220 may store data and may be a computer-readable medium, such as volatile or non-volatile memory. Storage device 1230 may provide storage for system 1200 including for example, the previously described methods. In various aspects, storage device 1230 may be a flash memory device, a disk drive, an optical disk device, or a tape device employing magnetic, optical, or other recording technologies.

Input/output structures 1240 may provide input/output operations for system 1200.

Figure 13:
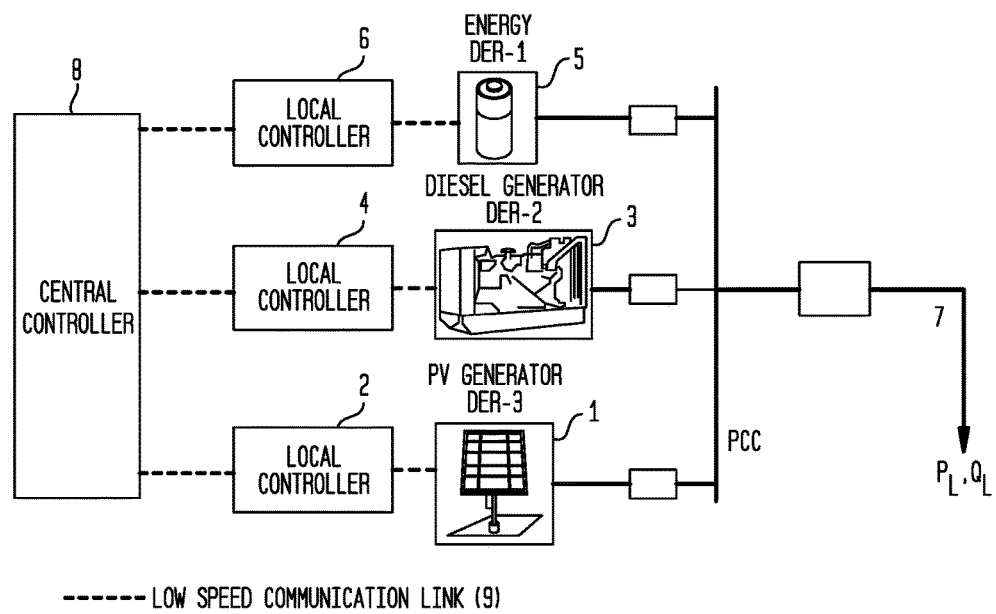
FIG. 13 is a schematic block diagram of the islanded microgrid according to the present disclosure.

Such a computer system may advantageously be integrated into an illustrative grid and/or microgrid the schematic of which is shown in FIG. 13. As a sample, illustrative case, it includes one photovoltaic (PV) branch and its local controller, a diesel generator branch and its local controller, and an energy storage branch and its local controller as well as loads that consume both active and reactive power. In practical applications, other types of renewable and conventional generations may be added to the islanded microgrid shown including wind power, natural gas, etc., among others.

Figure 14:
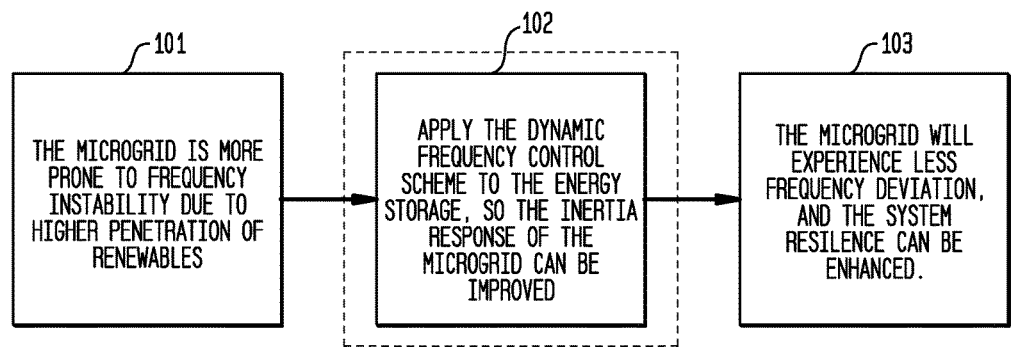
FIG. 14 is a schematic block diagram—flow diagram—depicting an overall control strategy according to the present disclosure.

Also shown in the figure is a central controller which may include or otherwise comprise the computer system shown schematically previously. FIG. 14 shows in a schematic flow diagram an overview of a method according to the present disclosure. As noted previously, the microgrid is more prone to frequency instability due to higher penetration of any renewables. Accordingly—and as noted previously—a dynamic control scheme according to the present disclosure is applied to the energy storage, such that an inertia response of the microgrid is improved such that the microgrid experiences less frequency deviation and system resilience is enhanced.

Figure 15:
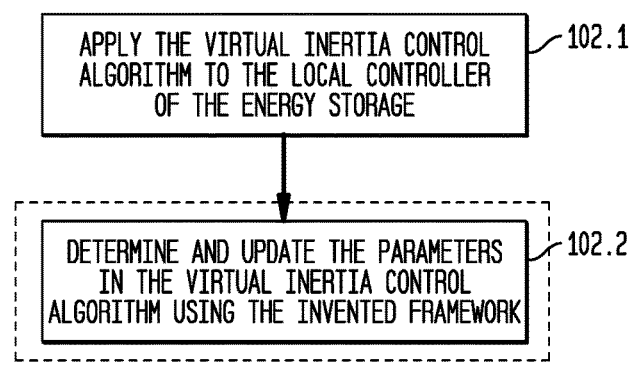
FIG. 15 is a schematic block diagram—flow diagram—depicting a control strategy according to the present disclosure.

Turning now to FIG. 15, there is shown a schematic flow diagram further explaining the dynamic frequency control method outlined in FIG. 14. As may be observed, the virtual inertial control method according to the present disclosure is first applied to the energy storage branch's local controller. Then the framework is operated in the central controller to determine and update parameters in virtual inertia control method based on the operation status of the microgrid.

Figure 16:
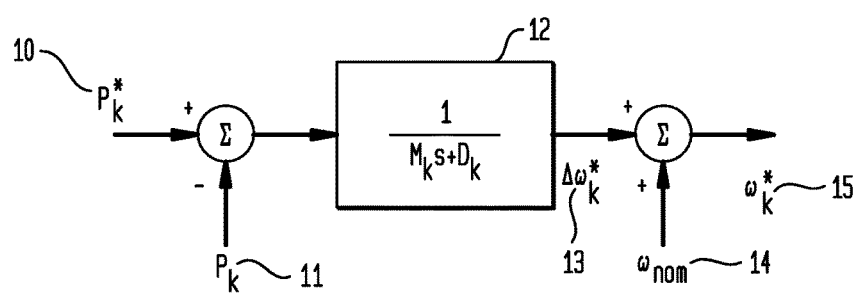
FIG. 16 is a schematic block diagram depicting a virtual inertia control strategy according to the present disclosure.

With reference now to FIG. 16, there it shows a virtual inertial control method according to the present disclosure implemented in an energy storage branch local controller wherein $P_k^*$ is the reference power and $P_k$ is the actual power of the energy storage branch, respectively. A virtual inertia controller accepts error power signal and generates a frequency compensation signal $\Delta\omega_k^*$ which is added to the normal frequency $\omega_{norm}$ so the reference frequency signal $\omega_k^*$ can be generated.

Figure 17:
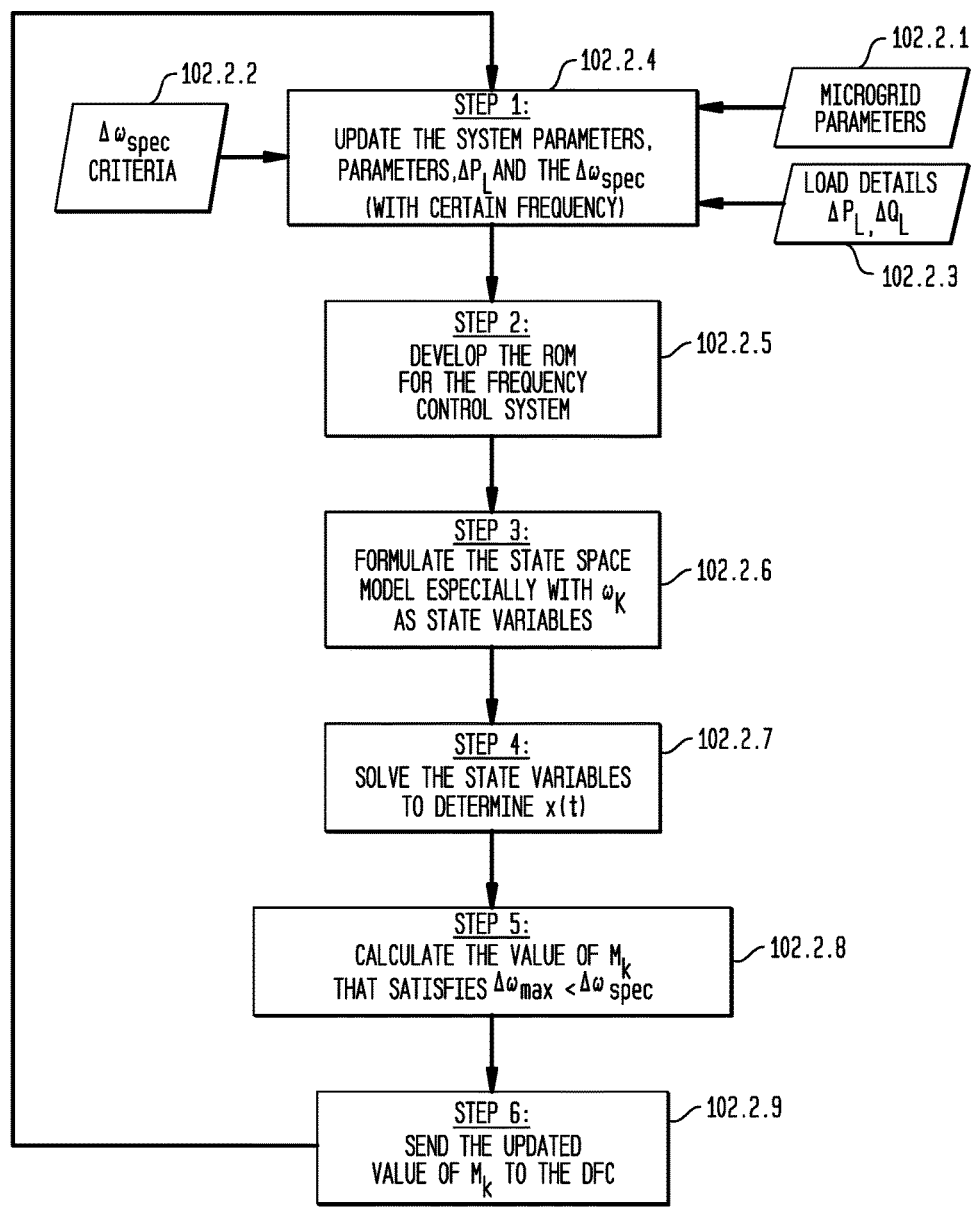
FIG. 17 is a schematic block diagram—flow diagram—depicting an overall control strategy according to the present disclosure.

FIG. 17 shows a flow chart depicting an illustrative method according to an aspect of the present disclosure. As may be readily appreciated by those skilled in the art, such an illustrative method may be programmed and executed by computer system such as that previously described and shown—such system comprising the central controller.

Operationally, and during system initialization, basic information about the microgrid is collected as shown at block 102.2.1. The information includes the configuration of each distributed generator in the microgrid, the parameters of each local controller, and electrical topology, etc.

Also obtained is a system resilience requirement at block 102.2.2, which includes the accepted frequency deviation and maximum tolerable power disturbance at block 102.2.3. After operation, information is updated with certain frequency, as shown at block 102.2.4.

Based on the collected information, the Reduced Order Model (ROM) of the system is developed at block 1.2.2.5

Then, the state space model of the system can be derived based on the ROM of the system at block 102.2.6. By solving the state space model at block 102.2.7, the value of the virtual inertia $M_k$, the central controller will send this information to the energy storage branch's local controller such that this parameter is updated at block 102.2.9.

Figure 18:
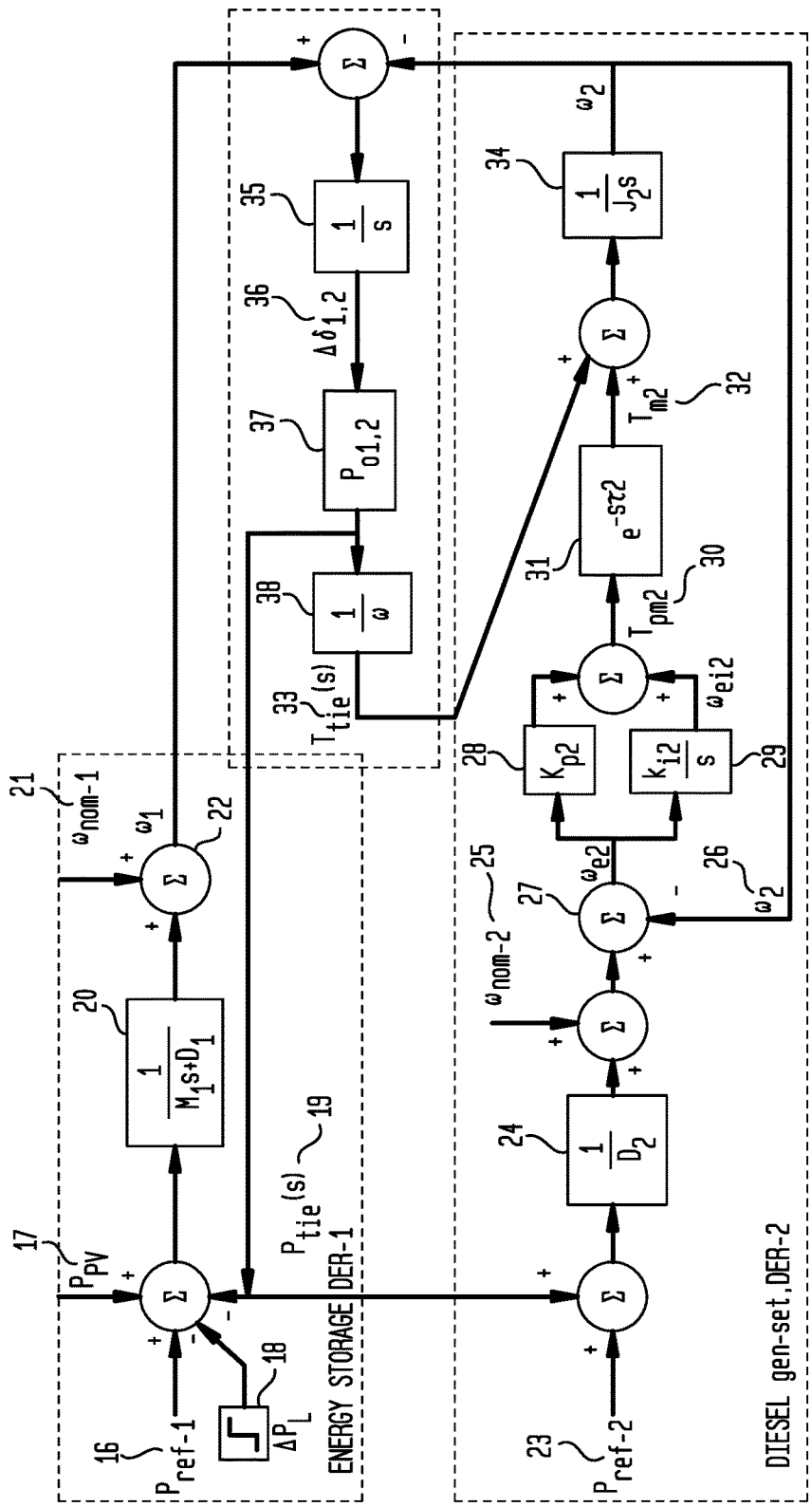
FIG. 18 is a schematic block diagram depicting the ROM on a microgrid according to the present disclosure.

FIG. 18 shows the ROM of the microgrid depicted previously. If different distributed generation units are connected in the microgrid, the ROM can be modified accordingly. In the energy storage branch, $P_{ref-1}$, 16 is the reference power of the energy storage system, which is representative of $P_k^*$ 10, in the earlier shown figure. Note further with respect to this FIG. 18 that $P_{PV}$ 17 is the PV output power, $\Delta P_L$ 18, is the amount of load change that causes system frequency disturbance, $P_{tie}(s)$ 19 is the power flowing in the tie line between the energy storage branch and the diesel generator branch; the model of the virtual inertia controller 12 is shown as 20. It generates the frequency compensation signal, which is added to the nominal frequency $\omega_{nom-1}$ 21, so the actual frequency signal $\omega_1$ 22 may be generated.

In the diesel generation branch $P_{ref-2}$, 23, is the reference power of the diesel generator. Block 24, is the droop gain which generates the frequency compensation signal based on the sum of $P_{ref-2}$, 23 and $P_{tie}(s)$, 19. The sum of the frequency compensation signal and the nominal frequency of the diesel generator $\omega_{nom-2}$ 25, is deducted by the actual frequency of the diesel generator $\omega_2$ 26, and the resulted frequency error $\omega_{e2}$ 27, is sent to a PI controller formed by 28 and 29. Shown further in this figure is $T_{pm2}$ 30 to generate the actual mechanical torque of the diesel generator, $T_{m2}$ 32. Similarly, $T_{tie}(s)$ 33 is the equivalent electrical torque due to the tie line power flow. Block 34 models the actual inertia of the synchronous generator connected to the diesel engine, it gets the sum of the $T_{m2}$ 33 and $T_{tie}(s)$ 19 with the reciprocal of the system frequency as shown in block 38.

The state space model based on ROM of the microgrid is shown in FIG. 19. By solving the differential equations, a proper value for $M_I$ in the virtual inertia controller can be determined so that the maximum deviation of the frequency under the maximum tolerable power disturbance will be smaller than the accepted frequency deviation.

The power system must maintain a balance between the amount of power generated and consumed. Disturbances in the grid could cause unbalances which are generally corrected using different frequency regulation techniques. DFC is a recent technique used in energy storage systems to provide frequency regulation especially when they are operated in a weak grid with poor inertial support. The amount of intertia required to provide frequency regulation varies based on the kind of interconnected DERs and also the amount of load change. A control strategy to effectively implement DFC in ES to maintain the frequency deviation within acceptable limits has been described herein. The idea of ROMs to depict the frequency control system of a microgrid and to calculate its frequency deviations for load changes has been validated herein. Finally, a case study to corroborate the control strategy according to the present disclosure for the DFC scheme is presented.

At this point, while we have presented this disclosure using some specific examples, those skilled in the art will recognize that our teachings are not so limited. Accordingly, this disclosure should be only limited by the scope of the claims attached hereto. Finally, additional background information may be determined from the following references namely, E. Figueres, G. Garcera, J. Sandia, F. Gonzalez-Espin and J. C. Rubio, "Sensitivity Study of the Dynamics of Three-Phase Photovoltaic Inverters With an LCL Grid Filter," Industrial Electronics, IEEE Transactions on, vol. 56, no. 3, pp. 706,717, March 2009; A. A. Renjit, M. S. Illindala and D. A. Klapp, "Graphical and Analytical Methods for Stalling Analysis of Engine Generator Sets," Industry Applications, IEEE Transactions on, vol. 50, no. 5, pp. 2967, 2975, September-October 2014; A. A. Renjit, M. S. Illindala, R. H. Lasseter, M. J. Erickson and D. Klapp, "Modeling and control of a natural gas generator set in the CERTS microgrid," Energy Conversion Congress and Exposition (ECCE), 2013 IEEE, vol., no., pp. 1640, 1646, 15-19 Sep. 2013; C. L. Haller, D. L. Harris and R. T. Fink, "Modeling of Emergency Diesel Generator and Governor Transient Response using MATLAB/SIMULINK," International OifHighway & Powerplant Congress & Exposition, Milwaukee, Wis., Sep. 11-13, 1995; A. Gangopadhyay, P. Meek, "Modeling, validation and system identification of a natural gas engine," Proceedings of the 1997 American Control Conference, Albuquerque, N. Mex., vol. I, 1997, pp. 294-298; and IEEE Recommended Practice for Excitation System Models for Power System Stability Studies, IEEE Power Engineering Society—IEEE Std 421.5™-2005

The invention claimed is:

1. In a microgrid energy system comprising a one or more generation branches and one or more storage branches, each generation branch including an electrical generator and a local controller, each storage branch including an electrical storage unit and a local controller, the microgrid energy system having a central controller in communication with each of the plurality of local controllers, a computer implemented method for improved dynamic frequency control of the energy system said method comprising:
   determining, by the central controller, basic information of the microgrid operation including configuration of each of the generators, parameters of each local controller and electrical topology;
   determining, by the central controller, system resilience requirement including an accepted frequency deviation and maximum tolerable power disturbance;
   updating, by the central controller, during operation of the energy system system parameters at a predetermined frequency;
   developing, by the central controller, a reduced order model (ROM) of the system;
   determining, by the central controller, a value of a virtual inertia of a branch from a state space model of the system derived from the ROM; and
   providing, by the central controller, the virtual inertia value to the local controller of the branch for which the virtual inertia value was determined;
   such that the one or more storage branches emulate the behavior of traditional synchronous generators thereby providing inertial support to the microgrid.

2. The method of claim 1 wherein the value of the virtual inertia is determined such that a maximum deviation of the frequency under a maximum tolerable power disturbance is smaller than an accepted frequency derivation.

3. The method of claim 2 wherein at least one of the plurality of generation branches is a renewable energy branch.

* * * * *